US005600326A

United States Patent [19]
Yu et al.

[11] Patent Number: 5,600,326
[45] Date of Patent: Feb. 4, 1997

[54] ADAPTIVE DIGITAL BEAMFORMING ARCHITECTURE AND ALGORITHM FOR NULLING MAINLOBE AND MULTIPLE SIDELOBE RADAR JAMMERS WHILE PRESERVING MONOPULSE RATIO ANGLE ESTIMATION ACCURACY

[75] Inventors: Kai-Bor Yu, Schenectady; David J. Murrow, Clifton Park, both of N.Y.

[73] Assignee: Martin Marietta Corp., Moorestown, N.J.

[21] Appl. No.: 807,546

[22] Filed: Dec. 16, 1991

[51] Int. Cl.$^6$ ............................................. G01S 7/36
[52] U.S. Cl. ............................................. 342/17; 342/149
[58] Field of Search .................................. 342/16, 17, 149

[56] References Cited

PUBLICATIONS

Y. T. Lo et al., "Antenna Handbook, Theory, Application, and Design", Van Nostrand Reinhold Co., N.Y. (1988), Chapter 13.
R. C. Davis et al., "Angle Estimation with Adaptive Arrays in External Noise Field", IEEE Trans. on Aerospace and Electronic Systems, vol. AES–12, No. 2, Mar. 1976, pp. 179–186.
R. R. Kinsey, "Monopulse Difference Slope and Gain Standards", IRE Trans., vol. AP–10, pp. 343–344, May 1962.
C. R. Clark, "Main Beam Jammer Cancellation and Target Angle Estimation with a Polarization–Agile Monopulse Antenna", 1989 IEEE Radar Conference, Mar. 29–30, 1989, Dallas, TX, pp. 95–100.
S. P. Applebaum et al., "Main Beam Jammer Cancellation for Monopulse Sensors", Final Tech. Report DTIC RADC-TR-84267, Dec., 1984.
S. P. Applebaum, "Adaptive Arrays", Syracuse University Research Corporation, TR 66–001, Aug. 1966 (Revised Mar. 1975).
S. P. Applebaum, "Adaptive Arrays", IEEE Transactions on Antennas and Propagation, vol. AP–24, No. 5, Sep. 1976, pp. 585–598.
Widrow et al., "Adaptive Antenna Systems", Proc. IEEE, vol. 55, Dec. 1967, pp. 2143–2159.
L. Haupt, "Simultaneous Nulling in the Sum and Difference Patterns of a Monopulse Antenna", IEEE Trans. on Antennas and Propagation, vol. AP–32, No. 5, May 1984, pp. 486–493.
L. Haupt, "Adaptive Nulling in Monopulse Antennas", IEEE Trans. on Antennas and Propagation, vol. 36, No. 2, Feb. 1988, pp. 202–208.
B. Vu, "Simultaneous Nulling in Sum and Difference Patterns by Amplitude Control", IEEE Trans. on Antennas and Propagation, vol. 34, No. 2, Feb. 1986, pp. 214–218.
R. Schmidt, "Multiple Emitter Location and Signal Parameter Estimation ", IEEE Trans. on Antennas and Propagation, vol. AP–34, Mar. 1986.

*Primary Examiner*—T. H. Tubbesing
*Attorney, Agent, or Firm*—W. H. Meise; C. A. Nieves; S. A. Young

[57] ABSTRACT

Monopulse radar operation is improved by nulling a single mainlobe jammer and multiple sidelobe jammers while maintaining the angle measurement accuracy of the monopulse ratio. A sidelobe jammer cancelling adaptive array is cascaded with a mainlobe jammer canceller, imposing a mainlobe maintenance technique or constrained adaptation during the sidelobe jammer cancellation process so that results of the sidelobe jammer cancellation process do not distort the subsequent mainlobe jammer cancellation process. The sidelobe jammers and the mainlobe jammer are thus cancelled sequentially in separate processes.

4 Claims, 7 Drawing Sheets

ADAPTIVE DIGITAL BEAMFORMING ARCHITECTURE AND ALGORITHM FOR NULLING MAINLOBE AND MULTIPLE SIDELOBE RADAR JAMMERS WHILE PRESERVING MONOPULSE RATIO ANGLE ESTIMATION ACCURACY

RELATED APPLICATIONS

This application is related to Yu and Murrow application Ser. No. 07/807,548 filed concurrently herewith and assigned to the instant assignee.

BACKGROUND OF THE INVENTION

This invention generally relates to radar techniques for determining angular location of a target and, more particularly, to an improvement in the monopulse technique so as to maintain accuracy of the monopulse ratio in the presence of jamming by adaptively and optimally suppressing the jamming before forming the conventional sum $\Sigma$ and difference $\Delta$ beam output signals for monopulse processing.

The monopulse technique is a radar technique in which the angular location of a target can be determined within fractions of a beamwidth by comparing measurements received from two or more simultaneous beams. This technique for direction of arrival (DOA) estimation of a target is widely employed in modern surveillance and tracking radar. See, for example, D. K. Barton, "Modern Radar Systems Analysis," Artech House (1988), M. Sherman, "Monopulse Principles and Techniques," Artech House (1988), and I. Leanov and K. I. Fomichev, "Monopulse Radar," Artech House (1986). In a typical phased array or digital beamforming (DBF) radar, one beam is formed in transmission and two beams are formed on reception for angle measurement.

The monopulse technique may be implemented for a linear array of N antenna elements which provide respective signals x (0), . . . , x (N–1) to the beamforming network from the elemental receiver. The output signals of the beamforming network are the sum $\Sigma$ and difference $\Delta$ signals which are processed in a processor to generate an output signal $\theta$ representing the direction of arrival estimation.

In the beamforming network, each of N input signals is split into two paths, linearly weighted, and then added together. The sum $\Sigma$ and difference $\Delta$ signals may be expressed in the form $$\Sigma = \underline{W}_\Sigma^H \underline{x} \quad (1)$$

$$\Delta = \underline{W}_\Delta^H \underline{x} \quad (2)$$

respectively, where $\underline{W}_\Sigma$ is real and even weighting, $\underline{W}_\Delta$ is purely imaginary and odd weighting, H indicates complex conjugate transpose and x is the vector of the measurements. When there is no jamming, Taylor and Bayliss weightings are typically used for sum beams and difference beams, respectively, so as to have a narrow mainlobe and low sidelobes. In the presence of jamming, the weights are adapted so as to form nulls responsive to the jammers. The quiescent Taylor and Bayliss weightings are designed for reducing the sidelobes in a practical system. See Y. T. Lo and S. W. Lee, "Antenna Handbook, *Theory, Applications, and Design*", Van Nostrand Reinhold Company, New York (1988), Chapter 13.

In a typical antenna pattern, the mainlobe of the pattern is a central beam surrounded by minor lobes, commonly referred to as sidelobes. Typically, it is desired to have a narrow mainlobe, high gain and low sidelobes so that the desired target within the mainlobe is enhanced and the response to clutter and jamming outside the mainlobe is attenuated. The sidelobe levels of an antenna pattern can be described in any of several ways. The most common expression is the relative sidelobe level, defined as the peak level of the highest sidelobe relative to the peak level of the main beam. Sidelobe levels can also be quantified in terms of their absolute level relative to isotropic.

The term "monopulse" refers to the fact that the echo from a single transmitted pulse returning from a target is used to measure the angle of the target, and that, typically, one beam (instead of two beams) is formed in transmission, and two beam output signals are formed on reception for angle measurement. The sum beam pattern has a symmetrical amplitude profile with its maximum at the boresight, and the difference beam pattern has an antisymmetrical amplitude profile with zero response at the boresight. The DOA of a target signal can be determined accurately through a look-up table by evaluating the monopulse ratio, i.e., the real part of $\Delta/\Sigma$. In fact, for a noiseless case and for uniform weighting, the monopulse ratio is exactly given by $$f(\theta) = \frac{\Delta(\theta)}{\Sigma(\theta)} = \tan\left(\pi T \frac{Nd}{2\lambda}\right) \quad (3)$$

where $T = \sin(\theta)$ and $\theta$ is the desired DOA, d is the array element spacing, N is the number of sensor elements, and $\lambda$ is the wavelength. This equation enables T and the corresponding $\theta$ to be determined exactly. In the presence of noise, the development of the DOA maximum likelihood estimator also leads naturally to monopulse processing using sum and difference beams. See R. C. Davis, L. E. Brennan, and I. S. Reed, "Angle Estimation with Adaptive Arrays in External Noise Field," *IEEE Trans on Aerospace and Electronic Systems*, Vol. AES-12, No. 2, March 1976. For zero-mean noise, the estimator is unbiased with mean square error (MSE) given by $$MSE = \frac{1}{2k^2 NSNR} \quad (4)$$

$$\text{where } k = \left(\frac{\dot{f}^2 |g(T)|^2}{1 + f^2}\right)^{1/2} \text{ factor.}$$

SNR is the signal-to-noise ratio at the elemental level, and g (T) is the two-way sum beam antenna pattern.

Various authors have defined the monopulse sensitivity factor in different ways (see R. R. Kinsey, "Monopulse Difference Slope and Gain Standards," *IRE Trans.*, Vol AP-10, pp. 343–344, May 1962). In this application, the monopulse sensitivity factor is defined as the constant of proportionality required in the denominator of the root-mean-square-error (RMSE) to convert the square root of twice the boresight signal-to-noise ratio in the beam to RMSE. Defined in this manner, the monopulse sensitivity factor has the desirable property of containing all target angle-of-arrival information. "f" is the monopulse function and "f dot" is the derivative of the monopulse function. See D. J. Murrow, "Height Finding and 3D Radar", Chapter 20, Radar Handbook (2nd Edition), McGraw-Hill.

This technique can also be considered for a planar array where the target azimuth and elevation angles are desired. In this setup, a set of sum ($\Sigma_e$) and difference ($\Delta_e$) beam output signals are formed along the elevation axis with input signals from each column of sensors. The $\Sigma_e$ beam output signals are then linearly combined in an adder to form the sum ($\Sigma=\Sigma_a\Sigma_e$) and difference ($\Delta_A=\Delta_a\Sigma_e$) beam output signals along the azimuth axis, where $\Sigma_a$ and $\Delta_a$ are the effective row sum beam and row difference beam, respectively. Similarly, the $\Delta_e$ beams are linearly combined in an adder to form the sum ($\Delta_E=\Sigma_a\Delta_e$) and difference ($\Delta_A=\Delta_a\Delta_e$) beam output signals along the azimuth axis. Monopulse ratios along azimuth or elevation direction can then be formed giving the azimuth and elevation DOA estimates by using the following equations:

$$f_a(\theta_a) = \frac{\Delta_A}{\Sigma} = \frac{\Delta_a\Sigma_e}{\Sigma_a\Sigma_e} = \frac{\Delta_a}{\Sigma_a} \tag{5}$$

and $$f_e(\theta_e) = \frac{\Delta_E}{\Sigma} = \frac{\Sigma_a\Delta_e}{\Sigma_a\Sigma_e} = \frac{\Delta_e}{\Sigma_e} . \tag{6}$$

These derivations make use of the separable property of the planar array patterns.

The monopulse technique for DOA estimation fails when there is sidelobe jamming (SLJ) and/or main lobe jamming (MLJ). If not effectively countered, electronic jamming prevents successful radar target detection and tracking. The situation is exacerbated by introduction of stealth technology to reduce the radar cross section (RCS) of unfriendly aircraft targets. The frequency dependence of the RCS encourages use of lower microwave frequency bands for detection. This leads to large apertures to achieve angular resolution. Large apertures to achieve small beamwidth results in interception of more jamming. On the other hand, constrained apertures lead to wider beamwidth, which implies interception of more mainlobe jamming.

Heretofore, no viable or practical technique for cancelling simultaneous mainlobe and sidelobe jammers has been developed or fielded in a radar. This makes the conception and development of such technique one of the more pressing and critical issues facing radar today. The challenge is to develop adaptive beamforming architectures and signal processing algorithms to cancel mainlobe and sidelobe jammers while maintaining target detection and angle estimation accuracy on mainlobe targets.

Clark (see C. R. Clark, "Main Beam Jammer Cancellation and Target Angle Estimation with a Polarization-Agile Monopulse Antenna," 1989 *IEEE Radar Conference*, Mar. 29–30, 1989, Dallas, Tex., pp. 95–100) addresses the problem of simultaneous mainlobe and sidelobe jamming cancellation but his work is distinguished from the present invention in three respects. First, Clark does not include the requirement of maintaining the monopulse ratio. Second, his approach uses the main array and sidelobe auxiliary array simultaneously. Third, as a consequence of using the arrays simultaneously, Clark's approach does not include mainlobe maintenance, thereby introducing distortion into the main beam.

It is therefore an object of the invention to adaptively and optimally suppress the jamming of monopulse radar before the sum and difference beam output signals are formed for monopulse processing.

Another object of the invention is to cancel a single mainlobe jammer and multiple sidelobe jammers of monopulse radar while maintaining target detection and angle estimation accuracy on mainlobe targets.

Another object of the invention is to incorporate a sidelobe jamming canceller and a mainlobe jamming canceller in a monopulse radar digital beamforming (DBF) architecture so as to maintain the monopulse accuracy for DOA estimation for mainlobe targets.

According to the basic principles of the invention, jammers of monopulse radar are nulled before forming the final $\Sigma$ and $\Delta$ beam output signals for monopulse processing. This is accomplished by a filtering approach together with a mainlobe maintenance technique. Identical processing is also required for both the $\Sigma$ and $\Delta$ beams in order to form an identical set of nulls responsive to the sidelobe jammers.

In a specific implementation of the invention, the sidelobe jammers (SLJs) are first suppressed but not the mainlobe jammer (MLJ). It is essential to include an appropriate mainlobe maintenance (MLM) technique at a prefiltering stage to prevent adverse interaction between the two techniques. The MLM technique prevents the sidelobe cancelling adaptive array technique from interfering with the mainlobe canceller (MLC). The resulting beams are adapted using Applebaum's orthogonal nulling technique to cancel the mainlobe jammer along each axis while forming the monopulse ratio in the other axis. (See S. P. Applebaum and R. Wasiewicz, *Main Beam Jammer Cancellation for Monopulse Sensors*, Final Tech. Report DTIC RADC-TR-86-267, December, 1984.)

In accordance with a preferred embodiment of the invention, a monopulse radar system is provided having an adaptive array antenna, a mainlobe canceller, and a monopulse processor for determining angle of arrival, the adaptive array antenna comprising multiple elemental sensors, the monopulse processor estimating angle of arrival using sum and difference beam output signals, and the mainlobe canceller generating the sum and difference beam output signals which, for one class of rectangular array with independent horizontal and vertical beamforming, can be expressed as a product of elevation and azimuth factors for use by the monopulse processor, simultaneously yielding an undistorted elevation angular measurement by cancelling a mainlobe jammer with nulls in azimuth and an undistorted azimuth angular measurement by cancelling the mainlobe jammer with nulls in elevation. Preprocessing means are coupled to the adaptive array antenna for forming an identical set of nulls responsive to jammers before the sum and difference beam output signals are formed for monopulse processing. The preprocessing comprises means for applying adaptive weights to the measured signal for suppression of sidelobe jamming. Means are provided for generating adaptive weight using a sample matrix inverse estimate with appropriate mainlobe maintenance. Additional means are provided for maintaining the mainlobe during preprocessing and still further means are provided for coupling the adaptive array in cascade with the mainlobe canceller.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
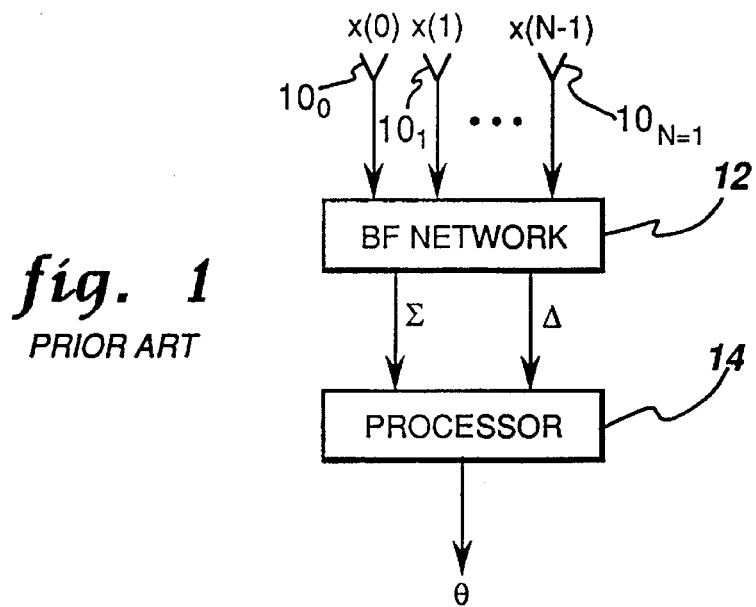
FIG. 1 is a block diagram showing a monopulse beamforming network for estimating direction of arrival.
Figure 2:
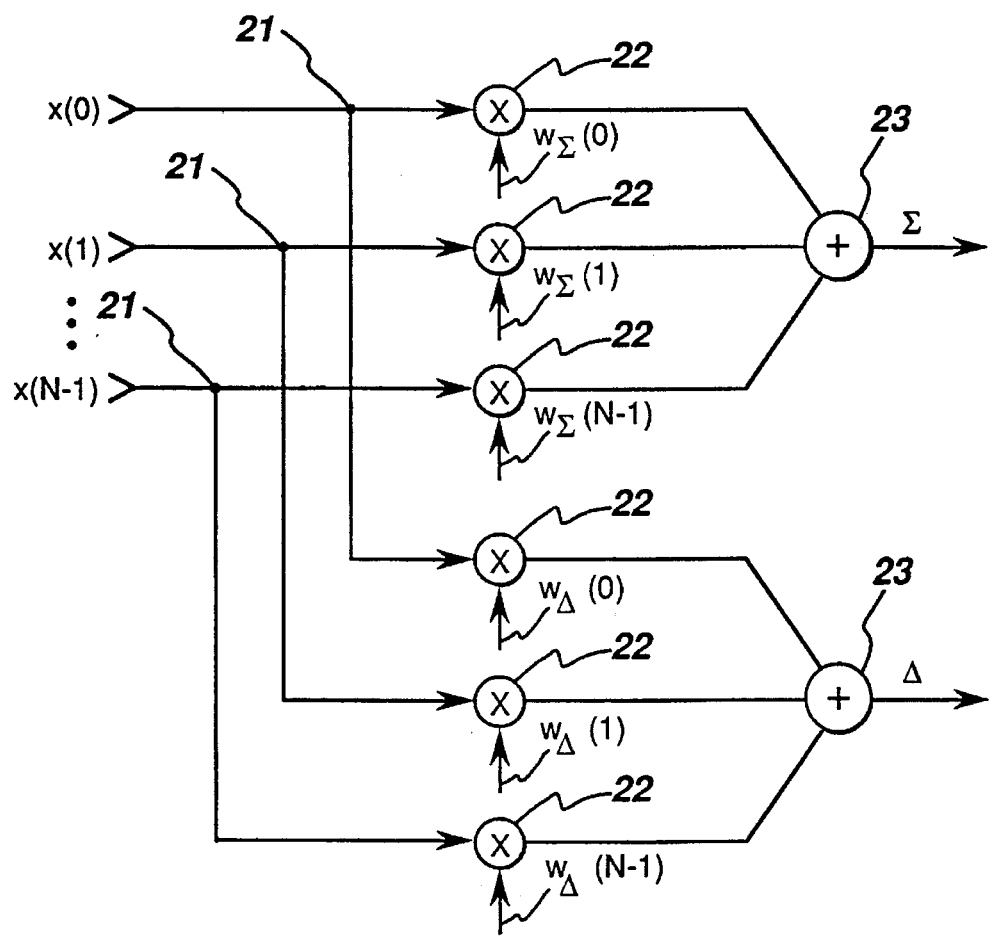
FIG. 2 is a detailed block diagram of a beamforming network.

In FIG. 1, a monopulse technique for DOA estimation is shown implemented for a linear array of antenna elements $10_0$ to $10_{N-1}$ which provide respective signals x (0), ..., x (N−1) to the beam forming (BF) network 12 for combining the input signals from the elemental receiver. The output signals of BF network 12 are the sum $\Sigma$ and difference $\Delta$ signals which are processed in a processor 14 to generate an output signal $\theta$ representing the direction of arrival estimation. Beamforming network 12 is more fully illustrated in FIG. 2. The beamforming network comprises signal splitters 21, weighting networks (for multiplication function) 22 and adders 23. Each of the N input signals is split into two paths, linearly weighted, and the signals in each of the two paths are then added together.

The sum $\Sigma$ and difference $\Delta$ signals are given by equations (1) and (2) as $$\Sigma = W_\Sigma^H x \quad (1)$$

$$\Delta = W_\Delta^H x \quad (2)$$

respectively. When there is no jamming, Taylor and Bayliss weightings are typically used for sum beams and difference beams, respectively, so as to have a narrow mainlobe and low sidelobes. In the presence of jamming, the weights are adapted so as to form nulls responsive to the jammers. The quiescent Taylor and Bayliss weightings are designed for reducing the sidelobes in a practical system.

Figure 3:
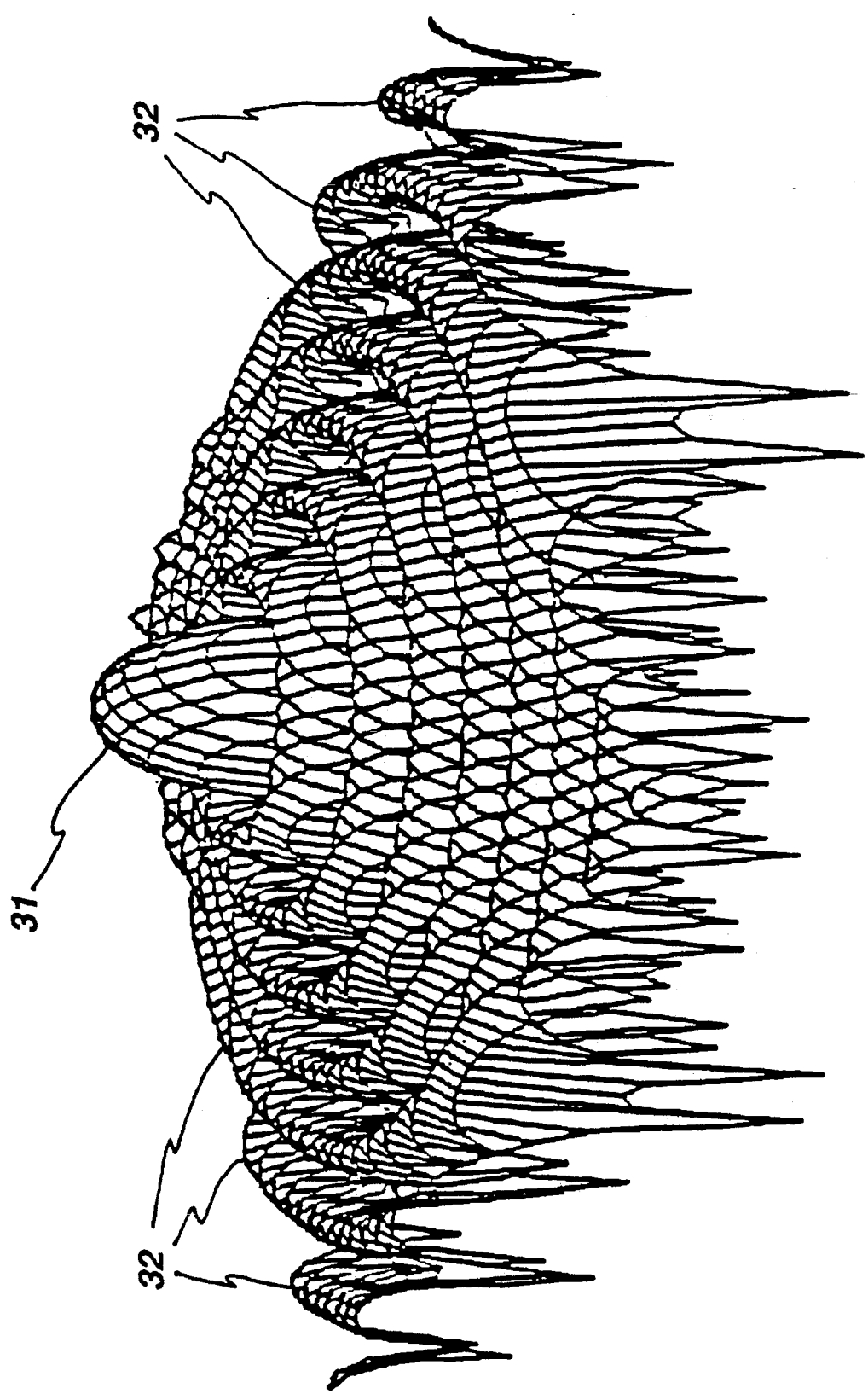
FIG. 3 is a perspective view of a monopulse radar sum beam antenna pattern.

FIG. 3 represents a typical sum beam antenna pattern. The mainlobe of the pattern is a central beam 31 surrounded by minor lobes 32, or sidelobes. Typically, it is desired to have a narrow mainlobe, high gain and low sidelobes so that the desired target within the mainlobe is enhanced and the response to clutter and jamming outside the mainlobe is attenuated.

Figure 4:
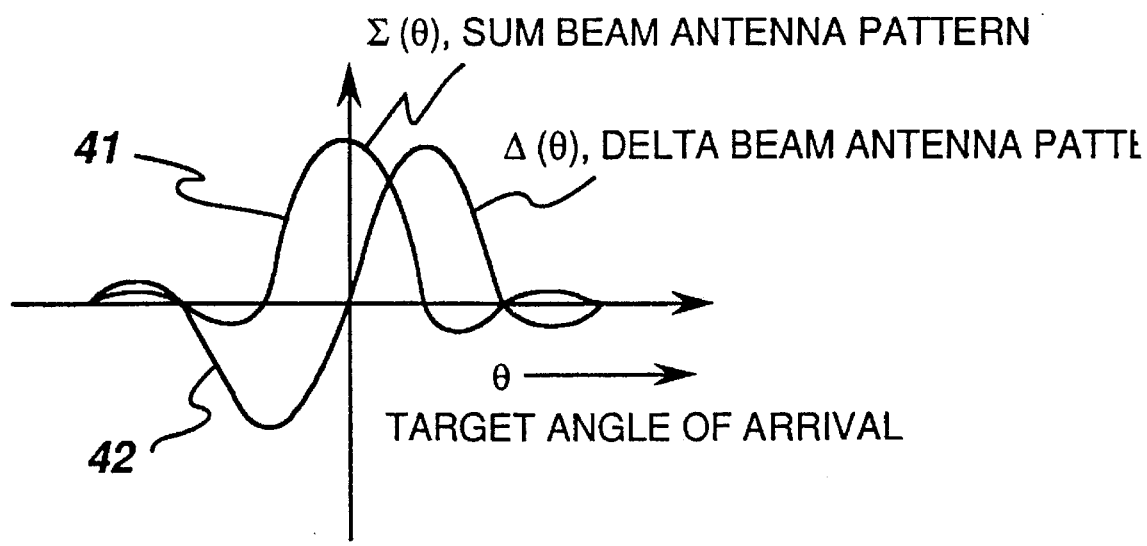
FIG. 4 is a graph of sum and difference beam patterns for monopulse antennas.
Figure 5:
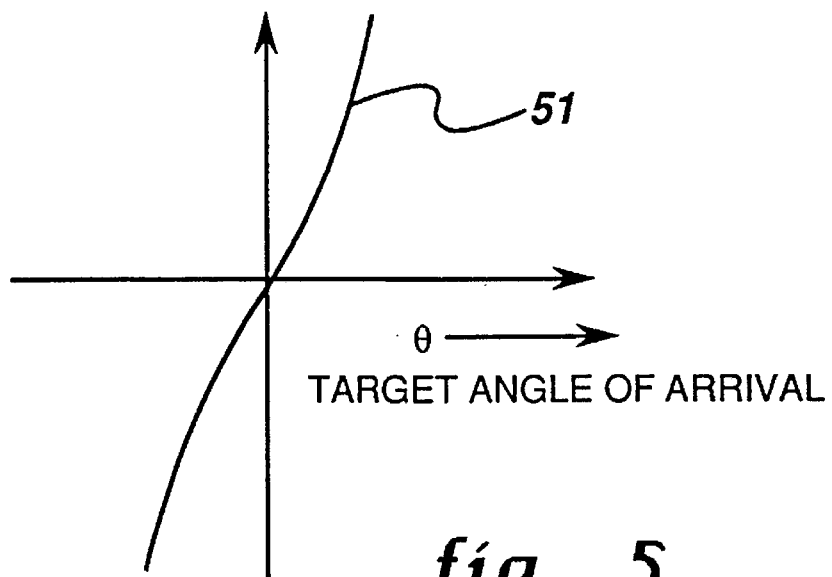
FIG. 5 is a graph of the monopulse ratio.

Typically, one beam (instead of two beams) is formed in transmission, and two beams are formed on reception for angle measurement. As shown in FIG. 4, the sum beam output signal 41 has a symmetrical amplitude profile with its maximum at the boresight, and the difference beam output signal 42 has an antisymmetrical amplitude profile with zero response at the boresight. The DOA of a target signal can be determined accurately through a look-up table by evaluating the monopulse ratio 51, i.e., the real part of $\Delta/\Sigma$ as shown in FIG. 5. For a noiseless case and for uniform weighting, the monopulse ratio is exactly given by equation (3) as $$f(\theta) = \frac{\Delta(\theta)}{\Sigma(\theta)} = \tan\left(\pi T \frac{Nd}{2\lambda}\right) \quad (3)$$

Thus, T and the corresponding $\theta$ can be determined exactly. For zero-mean noise, the estimator is unbiased with mean square error (MSE) given by equation (4) as $$MSE = \frac{1}{2k^2 NSNR} \quad (4)$$

where $k^2 = \frac{f^2 |g(T)|^2}{1+f^2}$, the monopulse sensitivity factor, which is defined earlier.

Figure 6:
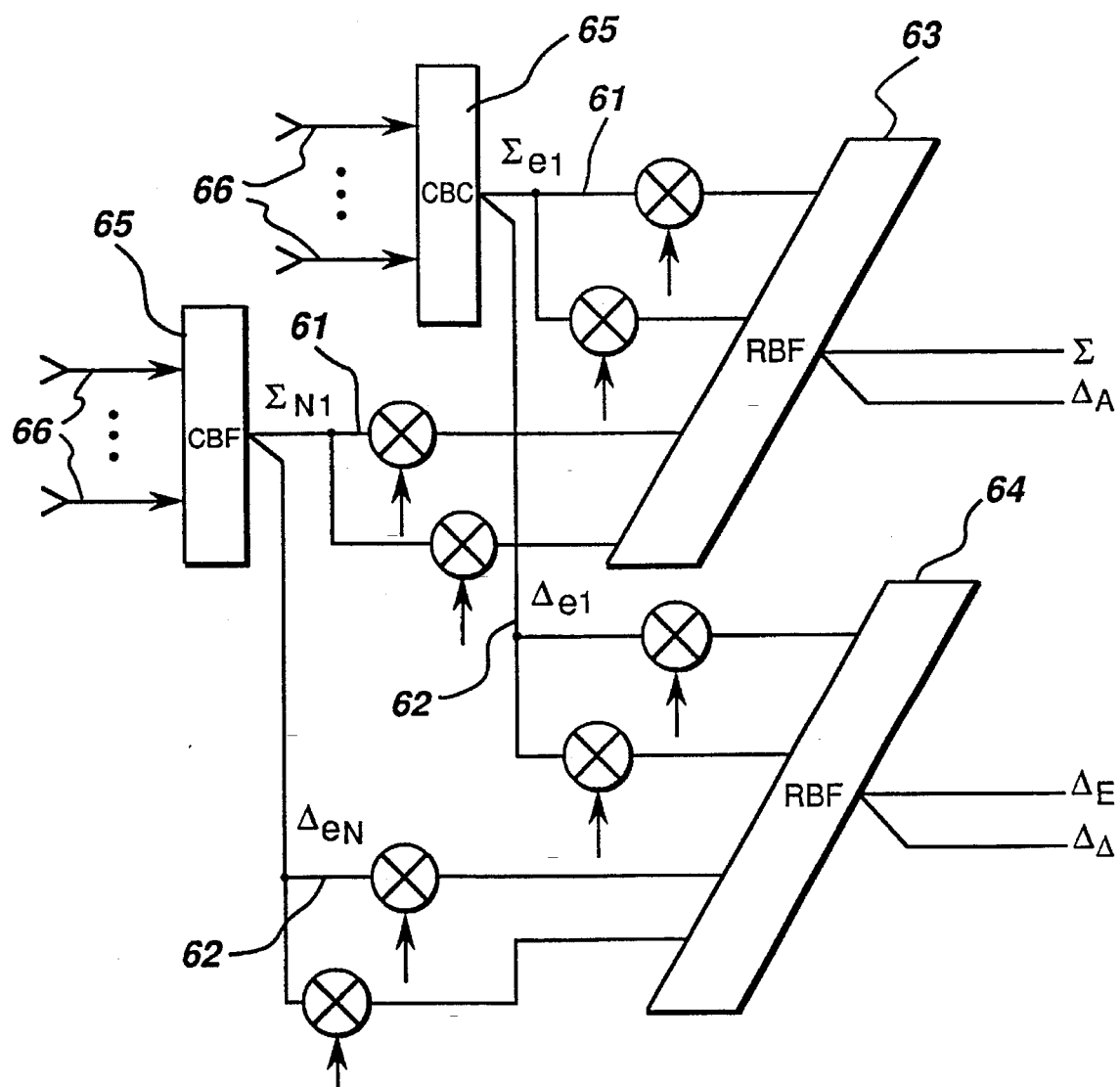
FIG. 6 is a block diagram of a monopulse radar.

This technique can also be considered for use with a planar array where the target azimuth and evaluation angles are desired, as shown in FIG. 6. In this setup, a column beamformer 65 for each column of sensors 66 forms a set 61 of sum beams $\Sigma_{e1}$ through $\Sigma_{eN}$ and a set 62 of difference beams $\Delta_{e1}$ through $\Delta_{eN}$ along the elevation axis with input signals from each column of sensors 66. The $\Sigma_e$ beams are then linearly combined in a row beamformer 63 to form signals representing the sum ($\Sigma = \Sigma_a \Sigma_e$) and difference ($\Delta_A = \Delta_a \Sigma_e$) beams along the azimuth axis. Similarly, the $\Delta_e$ beams are linearly combined in a row beamformer 64 to form signals representing the sum ($\Delta_E = \Sigma_a \Delta_e$) and difference ($\Delta_\Delta = \Delta_a \Delta_e$) beams along the azimuth axis. Monopulse ratios along azimuth or elevation direction can then be formed giving the azimuth and elevation DOA estimates by using equations (5) and (6) as set forth supra, which take advantage of the separable property of the planar array patterns.

The present invention provides cancellation of one mainlobe jammer and multiple sidelobe jammers in a way that enables both target detection and unbiased monopulse angle measurement. In order to show the motivation for the present invention, a review is first presented of some existing approaches for jammer cancellation. These include the sum-difference mainlobe canceller (MLC) described by S. P. Applebaum and R. Wasiewicz in Main *Beam Jammer Cancellation for Monopulse Sensors*, Final Tech. Report DTIC RADC-TR-86-267, December, 1984, and the adaptive array (AA) described by S. P. Applebaum in Adaptive Arrays, Syracuse Univ. Research Corp., Rep SPL-769, June 1964, and Widrow et al. in *Adaptive Antenna Systems, Proc. IEEE*, Vol. 55, December 1967.

Sum-Difference Mainlobe Canceller

Figure 7:
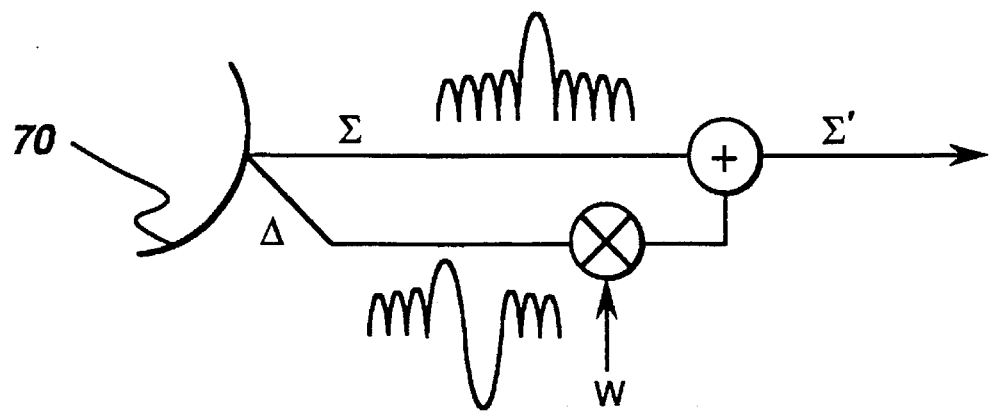
FIG. 7 is a block diagram showing a sum-difference mainlobe canceller.

The sum-difference mainlobe canceller (MLC) is shown in FIG. 7. In the example illustrated, a single parabolic antenna 70 is used to generate the sum ($\Sigma$) and difference ($\Delta$) signals. The high mainlobe gain output signal of the difference beam can be used to null the mainlobe jammer in the sum beam signal.

Except at the boresight, the difference beam has a high gain and thus can be used for cancelling the mainlobe jammer without introducing excessive noise in the main antenna. Suppose the jammer is at $T_j$, where $T_j$ is the direction cosine of the jammer. The optimal weight for cancelling the jammer is given approximately by $$W = \frac{\Sigma(T_j)}{\Delta(T_j)} \quad (7)$$

The weight W is given as the ratio of cross-correlation of sum and difference beam output signals to the auto-correlation of the difference beam output signaler and is closely approximated by equation (7) for large jammer-to-noise ratio (JNR). Since $\Sigma$ and $\Delta$ beams have comparable gain within the mainbeam, weight W would be a moderate number. If low gain auxiliary elements are used for mainlobe jamming cancellation, large weights are required for cancelling the jammer in the mainbeam, thus introducing high levels of noise into the system.

S. P. Applebaum et al. in the aforementioned Report DTIC RADC-TR-86-267 expanded on this idea and developed an architecture and algorithm for nulling the mainlobe jammer while preserving the monopulse ratio. The Applebaum et al. technique makes use of the idea that the patterns of the received beam are separable in azimuth and elevation, that is, the patterns can be expressed as products of sum and difference factors in both azimuth and elevation, i.e., $\Sigma=\Sigma_a\Sigma_e$, $\Delta_A=\Delta_a\Delta_e$, $\Delta_E=\Sigma_a\Delta_e$, $\Delta_\Delta=\Delta_a\Delta_e$).

Figure 8:
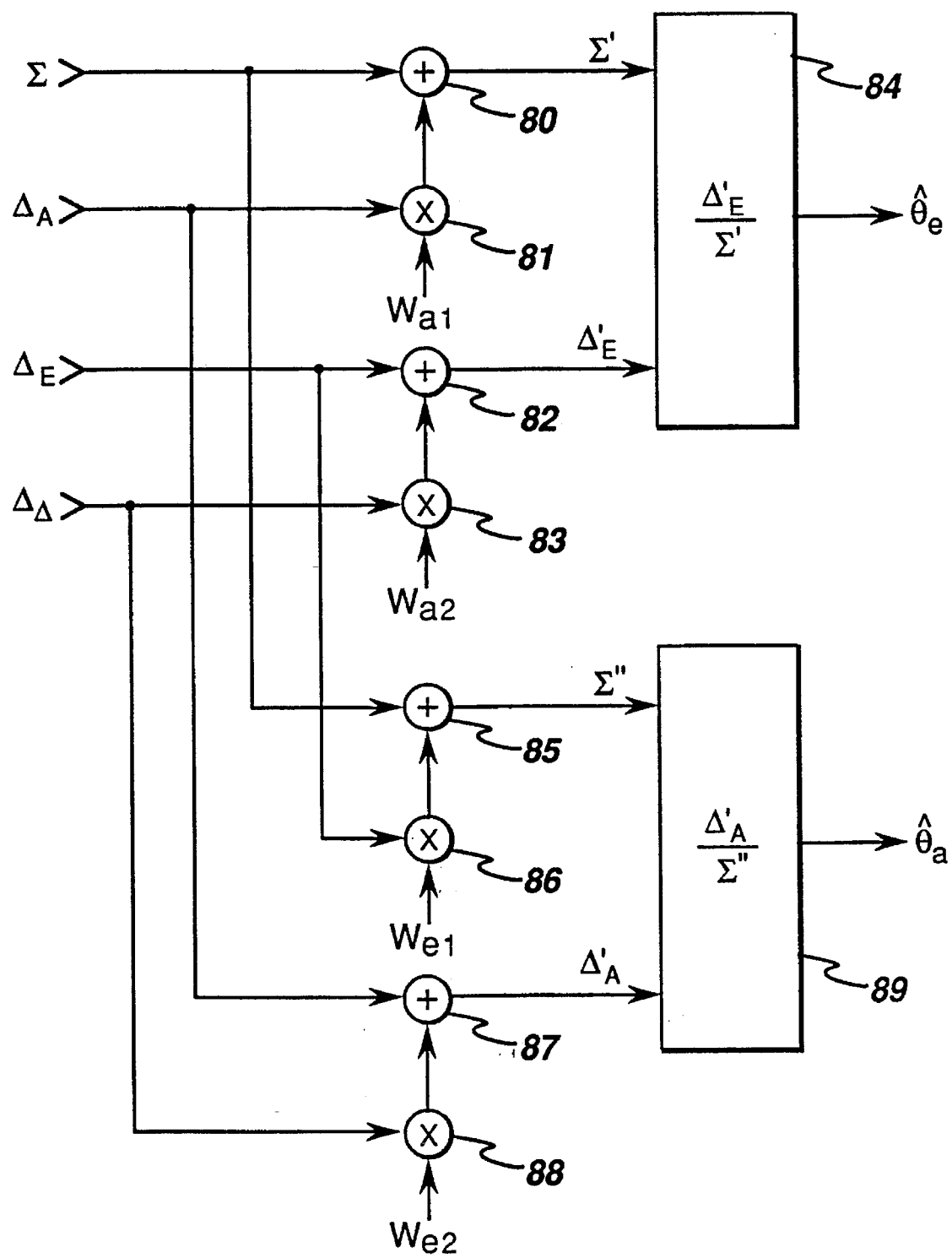
FIG. 8 is a block diagram showing a mainlobe canceller for monopulse processing.

The mainlobe canceller (MLC) architecture is shown in FIG. 8. In order to form the monopulse ratio along the elevation, the $\Sigma$ and $\Delta_E$ beams can be adapted by the $\Delta_A$ and $\Delta_\Delta$ beams to form $\Sigma'$ and $\Delta_E'$ beams as follows:

$$\Sigma'=\Sigma-W_{a1}\Delta_A \quad (8)$$

$$\Delta_E'=\Delta_E-W_{a2}\Delta_\Delta \quad (9)$$

where $W_{a1}$ and $W_{a2}$ are adaptation weights determined as set forth, infra. The adaptation of Equation (8) is implemented with a multiplier 81 and summer 80. Multiplier 81 receives as input signals adaptation weight $W_{a1}$ and the $\Delta_A$ beam output signal, and the product is summed in summer 80 with the $\Sigma$ beam output signal. Similarly, the adaptation of Equation (9) is implemented with a multiplier 83 and summer 82. Multiplier 83 receives as input signals adaptation weight $W_{a2}$ and the $\Delta_\Delta$ beam output signal, and the product is summed in summer 82 with the $\Delta_E$ beam output signal. The output signals of summers 80 and 82, i.e., $\Sigma'$ and $\Delta_E'$, are supplied to a processor 84 which generates the elevation monopulse ratio $\Delta_E'/\Sigma'$.

One mainlobe jammer can be cancelled along the azimuth by choosing the following adaptation weights Wa1 and Wa2 to minimize output signals for Equations (8) and (9):

$$W_{a1}=\frac{R_{\Sigma\Delta_A}}{R_{\Delta_A\Delta_A}}, \text{ and} \quad (10)$$

$$W_{a2}=\frac{R_{\Delta_E\Delta_A}}{R_{\Delta_\Delta\Delta_\Delta}}. \quad (11)$$

The cross-correlation $R_{\Sigma\Delta_A}$ between $\Sigma$ and $\Delta_A$ channels may be expressed as $$\Sigma_{\Sigma\Delta_A}=E[\Sigma\Delta_A^*],$$

where E, the expectation, can be obtained by ensemble cross-correlation given by $$\frac{1}{N}\sum_{t=1}^{N}\Sigma(t)\Delta^*_A(t).$$

Similarly, $$R_{\Delta_A\Delta_A}=E[\Delta_A\Delta_A^*], \quad (12)$$

$$R_{\Delta_E\Delta_A}=E[\Delta_E\Delta_A^*],$$

and $$R_{\Delta_\Delta\Delta_\Delta}=E[\Delta_\Delta\Delta_\Delta^*]$$

where the symbol * signifies complex conjugate. $W_{a1}$ should be equal to $W_{a2}$ analytically. In practice, however, $W_{a1}$ may not be equal to $W_{a2}$, as the weights are determined by data samples. In that case, we may force them to be equal (e.g., adapt $W_a$ in the $\Sigma$ channel and use it in the $\Delta$ channel or vice versa, or set $$W_a=\frac{W_{a1}+W_{a2}}{2},$$

i.e., choose the weight to be the average of the adapted weights). The monopulse ratio for the elevation angle estimation $f_e(\theta_e)$, where $f_e$ is the ratio of the adapted difference-elevation beam output signal to the adapted sum beam output signal, is obtained in processor 84 in the following manner:

$$f_e(\theta_e)=\frac{\Delta_E'}{\Sigma'} = \frac{\Delta_E-W_a\Delta_\Delta}{\Sigma-W_a\Delta_A} \quad (13)$$

$$= \frac{\Sigma_a\Delta_e-W_a\Delta_a\Delta_e}{\Sigma_a\Sigma_e-W_a\Delta_a\Sigma_e}$$

$$= \frac{\Delta_e(\Sigma_a-W_a\Delta_a)}{\Sigma_e(\Sigma_a-W_a\Delta_a)}$$

$$= \frac{\Delta_e}{\Sigma_e}.$$

Thus, the monopulse ratio along the elevation direction is maintained (except at the azimuth angle where there is a jammer), and the mainlobe jammer is cancelled.

Cancellation of the mainlobe jammer and maintaining the monopulse ratio along the azimuth direction can be developed in a similar manner. The adapted sum and difference beams $\Sigma''$ and $\Delta_A'$, respectively, are given by $$\Sigma''=\Sigma-W_{e1}\Delta_E, \text{ and} \quad (14)$$

$$\Delta_A'=\Delta_A-W_{e2}\Delta_\Delta, \quad (15)$$

where $W_{e1}$ and $W_{e2}$ are adaptation weights determined as set forth, infra. The adaptation of Equation (14) is implemented with a multiplier 86 and summer 85. Multiplier 86 receives as input signals adaptation weight $W_{e1}$ and the $\Delta_E$ beam, and the product is summed in summer 85 with the $\Sigma$ beam. Similarly, the adaptation of Equation (15) is implemented with a multiplier 88 and summer 87. Multiplier 88 receives as input signals adaptation weight $W_{e2}$ and the $\Delta_\Delta$ beam, and the product is summed in summer 87 with the $\Delta_A$ beam. The output signals of summers 85 and 87, i.e., $\Sigma''$ and $\Delta_A'$, are supplied to a processor 89 which generates the azimuth monopulse ratio $\Delta_A'/\Sigma''$.

The mainlobe jammer can be cancelled by choosing the following adaptive weights:

$$W_{e1}=\frac{R_{\Sigma\Delta_E}}{R_{\Delta_E\Delta_E}}, \text{ and} \quad (16)$$

$$W_{e2}=\frac{R_{\Delta_A\Delta_\Delta}}{R_{\Delta_\Delta\Delta_\Delta}}. \quad (17)$$

where $$R_{\Sigma\Delta_E}=E[\Sigma\Delta^*_E],$$

$$R_{\Delta_E\Delta_E}=E[\Delta_E\Delta^*_E]$$

and $$R_{\Delta_A\Delta_\Delta}=E[\Delta_A\Delta^*_\Delta].$$

Similarly, the weights can be set equal $$\left(\text{e.g., } W_e=\frac{W_{e1}+W_{e2}}{2}\right).$$

The monopulse ratio for the azimuth angle $\theta_a$ estimate can then be shown to be preserved:

$$f_a(\theta_a)=\frac{\Delta_A'}{\Sigma''} = \frac{\Delta_A-W_e\Delta_\Delta}{\Sigma-W_e\Delta_E} \quad (18)$$

$$= \frac{\Delta_a}{\Sigma_a}.$$

Adaptive Array

Adaptive receiving arrays for radar, which maximize the signal-to-noise ratio at the array output, were first developed by S. P. Applebaum in report SPL-769, supra. These arrays maximize the ratio of antenna gain in a specified scan direction to the total noise in the output signal. Similar techniques have been described for communications systems by Widrow et al., supra, which minimize the mean square error between the array output signal and a transmitted pilot signal which is known a priori at the receiver. The theory of adaptive arrays as applied to the angle measurement problem has been developed by R. C. Davis, L. E. Brennan and I. S. Reed, "Angle Estimation with Adaptive Arrays in External Noise Field" *IEEE Trans on Aerospace and Electronic Systems*, Vol. AES-12, No. 2, March 1976. The Davis et al. analysis of using maximum likelihood theory of angle estimation leads naturally to the adaptive sum and difference beams.

Figure 9:
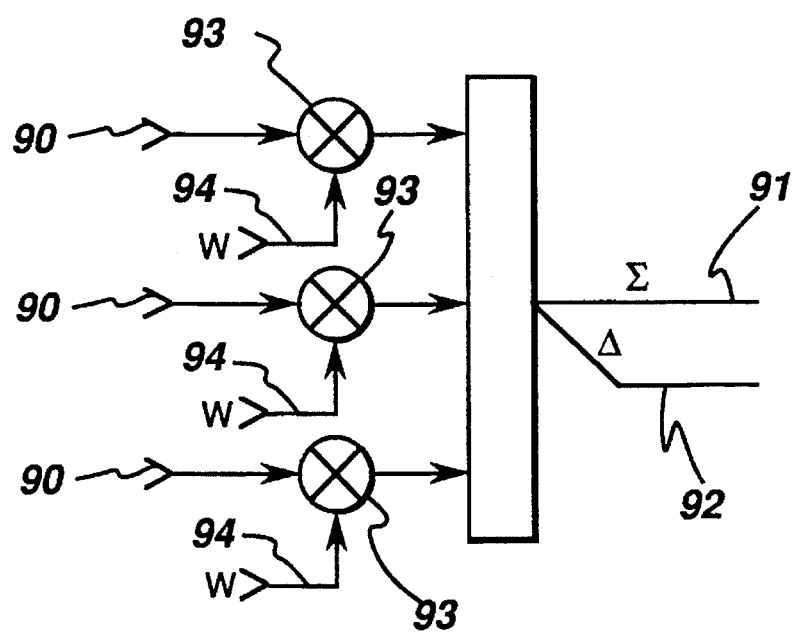
FIG. 9 is a block diagram showing an adaptive array for forming sum and difference beam output signals.

The array architecture is shown in FIG. 9. The sum and difference beams, represented by the symbols $\Sigma$ and $\Delta$, respectively, at array outputs 91 and 92, respectively, are determined by adaptive receiving array techniques which serve to null the interference sources. Because of the adaptivity which involves using multipliers 93 to apply an adaptive weight at multiplier inputs 94 to antenna array signals furnished at multiplier inputs 90, the two patterns vary with the external noise field and are distorted relative to the conventional monopulse sum and difference beams which possess even and odd symmetry, respectively, about a prescribed boresight angle. The adaptive weights for the sum and difference beams are given by $$\hat{W}_\Sigma = R^{-1} W_\Sigma, \text{ and} \quad (19)$$

$$\hat{W}_\Delta = R^{-1} W_\Delta, \quad (20)$$

where $W_\Sigma$ and $W_\Delta$ are the nominal sum and difference weights used in a conventional monopulse system and R is the covariance matrix of the total interference, which may include jamming and noise. The antenna patterns are distorted according to the following expressions, where S represents the target signal response vector:

$$\hat{\Sigma}(\theta) = \hat{W}_\Sigma^H S \quad (21)$$
$$= W_\Sigma^H R^{-1} S, \text{ and}$$

$$\hat{\Delta}(\theta) = \hat{W}_\Delta^H S \quad (22)$$
$$= W_\Delta^H R^{-1} S.$$

The resulting monopulse ratio is distorted and equal to $$\hat{f}(\theta) = Re\left(\frac{\hat{\Delta}(\theta)}{\hat{\Sigma}(\theta)}\right) \quad (23)$$
$$= Re\left(\frac{W_\Delta^H R^{-1} S}{W_\Sigma^H R^{-1} S}\right),$$

where Re signifies the real part of the expression, and the ideal monopulse ratio is $$f(\theta) = Re\left(\frac{W_\Delta^H S}{W_\Sigma^H S}\right). \quad (24)$$

This technique cancels both the mainlobe and sidelobe jammers but distorts the monopulse ratio. This approach for DOA estimation has been verified by computer simulation to work well for SLJs, but performance degrades when the jammers are within the mainlobe.

Techniques for simultaneous nulling in the sum and difference channels of a monopulsed phased array using one set of adaptive weights shared by both beams can be found in L. Haupt, "Simultaneous Nulling in the Sum and Difference Patterns of a Monopulse Antenna," *IEEE Trans. on Antennas and Propagation*, Vol. AP-32, No. 5, May 1984, pp. 486–493; L Haupt, "Adaptive Nulling in Monopulse Antennas," *IEEE Trans. on Antennas and Propagation*, Vol. 36, No. 2, February 1988, pp. 202–208; and B. Vu, "Simultaneous Nulling in Sum and Difference Patterns by Amplitude Control," *IEEE Trans. on Antennas and Propagation*, Vol. 34, No. 2, February 1986. It should be noted that nulls may be inserted in the two patterns by using separate adaptive weights and controls for the sum and difference channels. However, this would require two sets of adaptive beamforming hardware. Moreover, inserting a null in the sum does not automatically insert a null in the difference pattern and vice versa. Thus, attempts to adapt the beams separately to null the jammers will cancel the jammers but will also distort the monopulse ratio, thus impairing its usefulness for DOA estimation. Monopulse processing for DOA estimation requires simultaneous adaptation of the sum and difference beams.

Adaptive DBF Array followed by a Mainlobe Canceller

Figure 10:
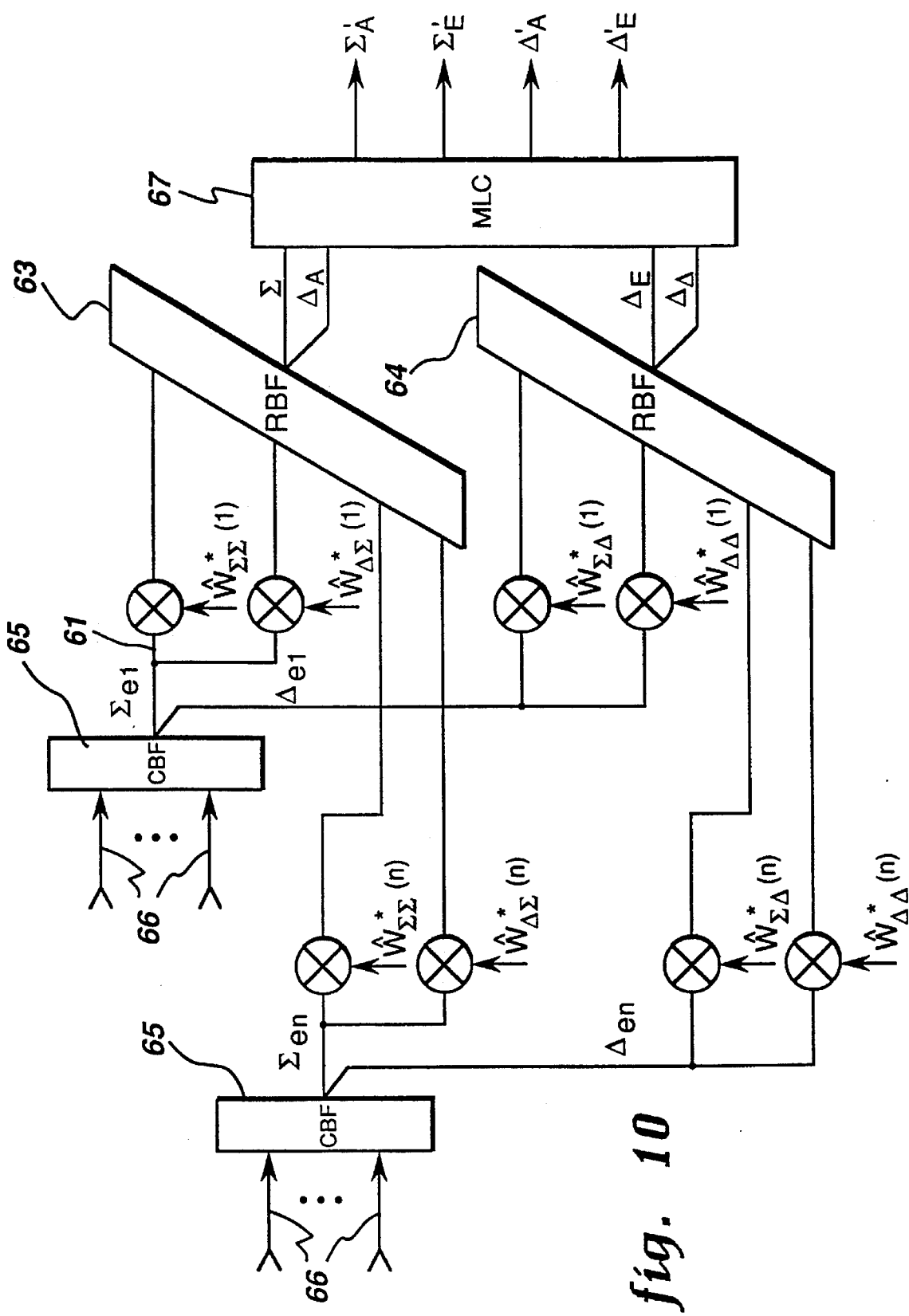
FIG. 10 is a simplified block diagram of the architecture of the invention, combining adaptive array and mainlobe canceller for monopulse processing.

FIG. 10 shows a specific implementation of the invention. This implementation is a two-stage digital beamforming (DBF) architecture for adaptive monopulse processing.

There are N columns in the DBF array, and each column has a column beamformer 65 for combining the M elemental sensors 66 input signals. At each column, the two beams ($\Sigma_{en}$ and $\Delta_{en}$) are formed by linearly combining input signals from each set of sensors. They are then digitized and beamformed, giving $$\Sigma = W_{\Sigma\Sigma}^H \underline{\Sigma}_e, \quad (25)$$

$$\Delta_A = W_{\Delta\Sigma}^H \underline{\Sigma}_e, \quad (26)$$

$$\Delta_E = W_{\Sigma\Delta}^H \underline{\Delta}_e, \text{ and} \quad (27)$$

$$\Delta_A = W_{\Delta\Delta}^H \underline{\Delta}_e, \quad (28)$$

where $$W_{\Sigma\Sigma} = R_{\Sigma_e}^{-1} \Sigma_e W_\Sigma, \quad (29)$$

$$W_{\Delta\Sigma} = R_{\Sigma_e}^{-1} \Sigma_e W_\Delta, \quad (30)$$

$$W_{\Sigma\Delta} = R_{\Delta_e}^{-1} \Delta_e W_\Sigma, \text{ and} \quad (31)$$

$$W_{\Delta\Delta} = R_{\Delta_e}^{-1} \Delta_e W_\Delta, \quad (32)$$

and where $W_\Sigma$ and $W_\Delta$ are the nominal sum and difference weights. Taylor and Bayliss weights are typically used. The sample matrix inverse modifies the weights and corresponds to a nulling preprocessing responsive to jammers.

A sample matrix inverse approach for jamming cancellation will effectively form nulls responsive to jammers. If one of the jammers is within the mainbeam, a null will be found responsive to the mainlobe jammer and the mainbeam will be distorted. In order to maintain the mainbeam without distortion, the mainlobe jammer effect must be excluded from the covariance matrix estimate. This may be accomplished by using the following modified covariance matrix in forming the adopted row beamforming weights, i.e. equation (29) through equation (32):

$$\hat{R} = R - P_1 J_1 J_1^H, \quad (33)$$

where R is the original sample matrix, $P_1$ is the power of the mainlobe jammer, and $J_1$ is the array response vector of the mainlobe jammer. This modified covariance matrix does not have the information of the mainlobe jammer, and thus there will not be a null responsive to the mainlobe jammer. The power and location can be obtained by analyzing the covariance matrix, such as by using the MUSIC algorithm (see R. Schmidt, "Multiple Emitter Location and Signal Parameter Estimation," *IEEE Trans. on Antennas and Propagation*, Vol. AP-34, March 1986).

An alternative method for suppressing the mainlobe jammer effect can be performed by using prefiltering to block the mainlobe jammer. A blocking matrix B can be designed when the direction of the mainlobe jammer is known, i.e., by making B orthogonal to the steering vector of the mainlobe jammer. The resulting sample vectors will thus be free of the mainlobe jammer and can then be used for covariance matrix estimates for sidelobe jammer cancellation.

The technique of preprocessing, together with an example of mainbeam constraint, is illustrated below. The covariance matrix can be decomposed into noise covariance and jamming covariance matrices as follows:

$$R = R_n + R_J \quad (34)$$
$$= \sigma_n^2 \left[ I + \sum_{k=1}^{K} (JNR)_k J_k J_k^H \right],$$

where $\sigma_n^2$ is the elemental noise variance, $(JNR)_k$ is the kth jamming-to-noise ratio, and $J_k$ is the kth jamming factor. For conventional preprocessing without mainbeam maintenance, $R^{-1}$ is applied to the vector input before forming the $\Sigma$ and $\Delta$ beams, i.e., $$\hat{\Sigma}(\theta) = \hat{W}_\Sigma^H S \quad (35)$$
$$= W_\Sigma^H R^{-1} S$$
$$= \frac{1}{\sigma_n^2} \left[ W_\Sigma^H S - \sum_{k=1}^{K} \frac{(JNR)_k (W_\Sigma^H J_k)}{1 + (JNR)_k N} J_k^H S \right].$$

This explicit expression for $R^{-1}$ is derived for the case of well-resolved jammers. An example of the technique to maintain the mainlobe is to apply R' instead of R in the preprocessing state where $R' = R - P_1 J_1 J_1^H$, $P_1$ is the power estimate of the MLJ, $J_1$ is the direction vector estimate within the mainlobe corresponding to the MLJ, $W_\Sigma$ is the conventional $\Sigma$ beam weight, and $W_\Sigma^H S$ is the ideal sum beam.

An expression for the modified $\Delta$ beam can also be derived $J_k^H S$ has an interpretation that the beam is steered to the jammer direction. In order to maintain the $\Sigma$ beam within the mainlobe, the effect of the jammer within the mainbeam (e.g., the first jammer $J_1$) is suppressed, i.e., $$\hat{\Sigma}(\theta) \approx \frac{1}{\sigma_n^2} \left[ W_\Sigma^H S - \sum_{k=2}^{K} \frac{(JNR)_k (W_\Sigma^H J_k)}{1 + (JNR)_k N} J_k^H S \right]. \quad (36)$$

It should be noted that summation is from k=2 to k=K. The $\Delta$ beam can also be maintained accordingly; that is, $$\hat{\Delta}(\theta) = \hat{W}_\Delta^H S$$
$$= W_\Delta^H R^{-1} S$$
$$\approx \frac{1}{\sigma_n^2} \left[ W_\Delta^H S - \sum_{k=2}^{K} \frac{(JNR)_k (W_\Delta^H J_k)}{1 + (JNR)_k N} J_k^H S \right]$$

The product beams, i.e., two-dimensional azimuth and elevation beams) are then free of SLJs but may include the MLJ. The mainbeam jammer is cancelled by adapting the two-dimensional $\Sigma$ and $\Delta$ beams simultaneously. For example, in order to form the monopulse ratio in elevation, the $\Sigma$ and $\Delta$ beams are adapted to cancel the MLJ simultaneously as follows:

$$\Sigma' = \Sigma - w_a \Delta_A, \text{ and} \quad (37)$$
$$\Delta'_E = \Delta_E - w_a \Delta_\Delta. \quad (38)$$

This can be done by adapting $w_a$ in the $\Sigma$ channel and using it in the $\Delta$ channel, or choosing $w_a$ to adapt to the $\Sigma$ and $\Delta$ beams simultaneously. In this way, the monopulse ratio can be shown to be preserved along the elevation axis while the jammer is nulled along the azimuth axis as follows:

$$\frac{\Delta'_E}{\Sigma'} = \frac{\Delta_e}{\Sigma_e}. \quad (39)$$

The same technique can also be used to preserve the monopulse ratio along the azimuth with the mainlobe jammer cancelled along the elevation.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. In a monopulse radar system having an adaptive array antenna, a mainlobe canceller, and a monopulse processor for determining angle of arrival, said adaptive array antenna comprising multiple elemental sensors, said monopulse processor being operable to form target angle of arrival estimation using received sum and difference beam output signals, and said mainlobe canceller being operable to generate said signals representing said sum and difference beams expressed as a product of elevation and azimuth factors for use by said monopulse processor while simultaneously yielding an undistorted elevation angular measurement by cancelling a mainlobe jammer with nulls in azimuth and an undistorted azimuth angular measurement by cancelling said mainlobe jammer with nulls in elevation, the improvement comprising:

preprocessing means coupled to said adaptive array antenna for forming an identical set of nulls responsive to jammers before said sum and difference beams are formed for monopulse processing;

means for maintaining the mainlobe during preprocessing; and means coupling said adaptive array in cascade with said mainlobe canceller.

2. The improvement of claim 1, wherein said means for maintaining the mainlobe during preprocessing comprises means for suppressing the effect of the jammer within the mainlobe by removing said jammer during said preprocessing.

3. A monopulse radar system for nulling a mainlobe jammer and multiple sidelobe jammers, comprising:

a plurality of elemental sensors arranged in columns and responsive to received radar signals;

column beamformers for combining said plurality of elemental sensors input signals in each of said columns;

mainlobe maintenance means coupled to said column beamformers for suppressing the mainlobe jammer;

covariance matrix estimation and inversion means coupled to said mainlobe maintenance means; and monopulse processor means for angle estimation using said covariance matrix inversion means and said mainlobe maintenance means for producing a sum signal $\Sigma$ and a difference signal $\Delta$ such that said $\Sigma$ and $\Delta$ signals have an identical set of nulls responsive to said jammers.

4. The monopulse radar system of claim 3 including weighting means coupling said column beamformers and said mainlobe maintenance means to said monopulse processor means for providing adaptive weighting to output signals from the analog-to-digital conversion means for each of said columns of sensors.

\* \* \* \* \*